United States Patent
Roberts et al.

(10) Patent No.: US 9,652,783 B2
(45) Date of Patent: May 16, 2017

(54) METHODS AND SYSTEMS FOR CONTROLLING PRESENTATION OF MEDIA CONTENT BASED ON USER INTERACTION

(75) Inventors: Brian F. Roberts, Dallas, TX (US); Donald H. Relyea, Dallas, TX (US); Shadman Zafar, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1027 days.

(21) Appl. No.: 12/494,550

(22) Filed: Jun. 30, 2009

(65) Prior Publication Data
US 2010/0332329 A1 Dec. 30, 2010

(51) Int. Cl.
G06Q 30/00 (2012.01)
G06Q 30/02 (2012.01)

(52) U.S. Cl.
CPC ......... G06Q 30/0269 (2013.01); G06Q 30/02 (2013.01)

(58) Field of Classification Search
USPC ............... 725/13, 14, 10, 12, 9, 40, 42, 43; 348/734
See application file for complete search history.

(56) References Cited

U.S. PATENT DOCUMENTS

| | | | | |
|---|---|---|---|---|
| 5,705,997 | A * | 1/1998 | Park | F21V 33/0052 200/310 |
| 5,717,923 | A * | 2/1998 | Dedrick | |
| 6,886,000 | B1 * | 4/2005 | Aggarwal | G06Q 30/02 705/26.3 |
| 2002/0073424 | A1 | 6/2002 | Ward et al. | |
| 2002/0144259 | A1 * | 10/2002 | Gutta et al. | 725/10 |
| 2002/0178447 | A1 | 11/2002 | Plotnick et al. | |
| 2003/0110499 | A1 * | 6/2003 | Knudson et al. | 725/42 |
| 2004/0204997 | A1 * | 10/2004 | Blaser et al. | 705/14 |
| 2005/0096979 | A1 * | 5/2005 | Koningstein | 705/14 |
| 2005/0132420 | A1 * | 6/2005 | Howard | G06F 3/017 725/135 |
| 2005/0181722 | A1 | 8/2005 | Kopra et al. | |
| 2006/0161553 | A1 * | 7/2006 | Woo | G06F 17/30 |
| 2007/0011039 | A1 | 1/2007 | Oddo | |
| 2008/0033826 | A1 | 2/2008 | Maislos et al. | |
| 2008/0040216 | A1 * | 2/2008 | Dellovo | G06Q 10/0637 705/14.44 |
| 2008/0228819 | A1 * | 9/2008 | Minnis et al. | 707/104.1 |
| 2008/0276270 | A1 * | 11/2008 | Kotaru et al. | 725/34 |
| 2008/0288354 | A1 * | 11/2008 | Flinn et al. | 705/14 |
| 2009/0248515 | A1 * | 10/2009 | Seidel | G06Q 30/02 705/14.53 |

(Continued)

FOREIGN PATENT DOCUMENTS

CN 1610405 4/2005

Primary Examiner — Luis A Brown

(57) ABSTRACT

An exemplary method includes monitoring an interaction of a user with a media content access subsystem to determine whether the user is actively or passively interacting with the media content access subsystem, maintaining an interaction profile associated with the user based on the monitored interaction, and controlling a presentation of media content to the user by the media content access subsystem in accordance with the interaction profile. Corresponding methods and systems are also disclosed.

13 Claims, 9 Drawing Sheets

(56) References Cited

U.S. PATENT DOCUMENTS

2009/0313324 A1* 12/2009 Brooks ............... H04N 21/235
709/203
2010/0070995 A1* 3/2010 Pan .................... H04N 5/44508
725/34

* cited by examiner

METHODS AND SYSTEMS FOR CONTROLLING PRESENTATION OF MEDIA CONTENT BASED ON USER INTERACTION

BACKGROUND INFORMATION

Set-top boxes and other media content access devices are often configured to provide users with access to a large number and variety of media content choices. For example, a user may choose to experience a variety of broadcast television programs, pay-per-view services, video-on-demand programming, Internet services, and audio programming via a set-top box.

The large number of media content choices available via an access device can make it difficult for a user of the access device to find and select desired media content. For example, it is often cumbersome to find and select a television program of interest to a user out of the plethora of television programs available via a set-top box.

Because of the large number of media content choices available via an access device, various attempts have been made to customize how the media content is presented to a particular user. For example, an access device may be configured to automatically present sports programming choices to a user who has indicated that he or she is interested in sports. However, such attempts have failed to take into account that the interests and attention level of a user may vary greatly depending on the user's circumstances.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary methods and systems for controlling presentation of media content to a user based on interaction of the user with a media content access subsystem are disclosed herein. As described in more detail below, an interaction of a user with a media content access subsystem may be monitored. An interaction profile associated with the user based on the monitored interaction may be maintained. A presentation of media content to the user by the media content access subsystem may be controlled in accordance with the interaction profile.

As an example, an exemplary method includes monitoring an interaction of a user with a media content access subsystem to determine whether the user is actively or passively interacting with the media content access subsystem, maintaining an interaction profile associated with the user based on the monitored interaction, and controlling a presentation of media content to the user by the media content access subsystem in accordance with the interaction profile.

Another exemplary method includes monitoring an interaction of a user with a media content access subsystem, maintaining an interaction profile associated with the user based on the monitored interaction, and dynamically selecting at least one advertisement to be presented to the user by the media content access subsystem in accordance with the interaction profile.

An exemplary system includes a monitoring facility configured to monitor an interaction of a user with a media content access device to determine whether the user is actively or passively interacting with the media content access device, an interaction profile facility configured to maintain an interaction profile associated with the user based on the monitored interaction, and a presentation facility configured to control a presentation of media content to the user by the media content access device in accordance with the interaction profile.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be viewed or otherwise experienced by a user.

Figure 1:
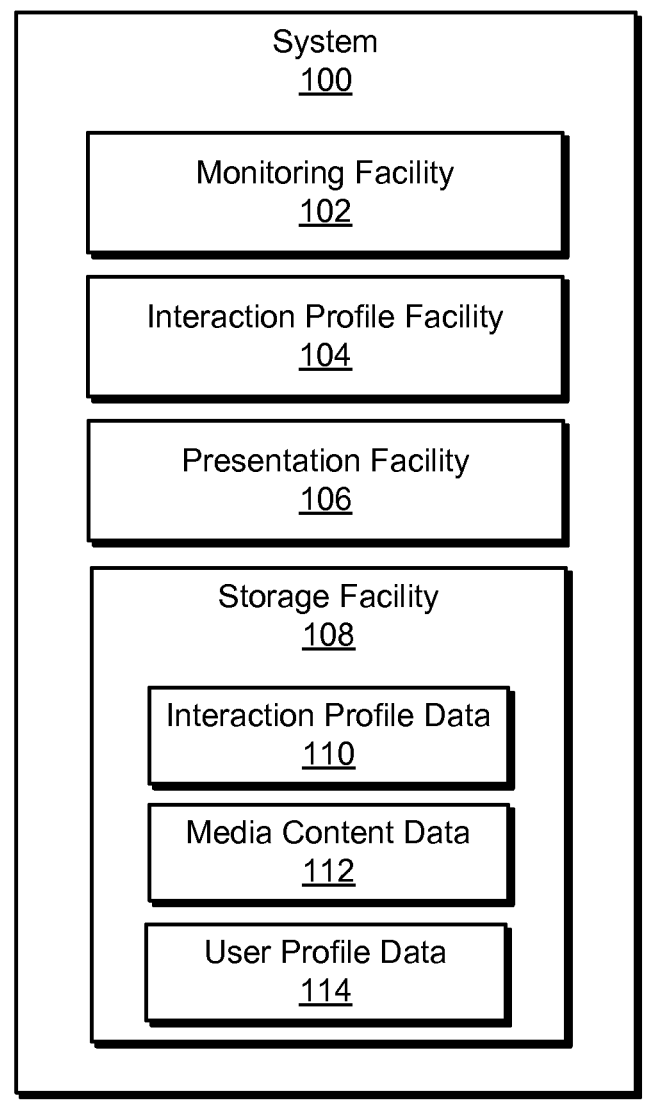
FIG. 1 illustrates an exemplary media content access system according to principles described herein.

FIG. 1 illustrates an exemplary media content access system 100 (or simply "system 100"). As will be described in more detail below, system 100 may be configured to facilitate customized presentation of media content to a user in accordance with interaction of the user with a media content access subsystem (e.g., a set-top box ("STB"), mobile phone, video phone, etc.).

System 100 may include, but is not limited to, a monitoring facility 102, an interaction profile facility 104, a presentation facility 106, and a storage facility 108. Monitoring facility 102 may be configured to monitor an interaction of a user with a media content access subsystem. For example, monitoring facility 102 may be configured to detect the occurrence of one or more "interaction events"

performed by or otherwise associated with the user. Each interaction event, or lack thereof, may be indicative of a type or level of interaction of the user with the media content access subsystem. For example, as will be described in more detail below, one or more interaction events may be indicative of one or more time periods of "active" interaction of the user with the media content access subsystem wherein the user is actively engaged, using, paying attention to, or otherwise interacting with the media content access subsystem. One or more interaction events, or lack thereof, may be indicative of one or more time periods of "passive" interaction of the user with the media content access subsystem wherein the user is only passively engaged, using, paying attention to, or otherwise interacting with the media content access subsystem. Monitoring facility 102 may additionally or alternatively be configured to monitor an interaction of a user with a media content access subsystem in other ways, as will be described in more detail below.

Interaction profile facility 104 may be configured to maintain an interaction profile associated with a user of the media content access subsystem. The interaction profile may be configured to represent how the user interacts with the media content access subsystem and may be dynamically updated by interaction profile facility 104 as monitoring facility 102 detects various interaction events performed by the user. In some examples, the interaction profile may be stored as interaction profile data 110 in storage facility 108.

Presentation facility 106 may be configured to control a presentation of media content to the user by the media content access subsystem in accordance with the interaction profile associated with the user. To this end, storage facility 108 may be configured to maintain media content data 112 representative of one or more media content instances. Storage facility 108 may additionally or alternatively maintain user profile data 114, which will be described in more detail below. Implementations and embodiments of monitoring facility 102, interaction profile facility 104, presentation facility 106, and storage facility 108 will be described in more detail below.

By monitoring how a particular user interacts with a media content access subsystem, system 100 may customize how media content is presented to the user by the media content access subsystem. For example, as will be described in more detail below, system 100 may be configured to automatically present media content of relatively greater interest to the user when the user is actively interacting with the media content access subsystem. System 100 may additionally or alternatively be configured to dynamically present customized advertisements to the user depending on the mood and/or level of interaction of the user with the media content access subsystem. Various examples of how system 100 may customize presentation of media content to the user will be described below.

System 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
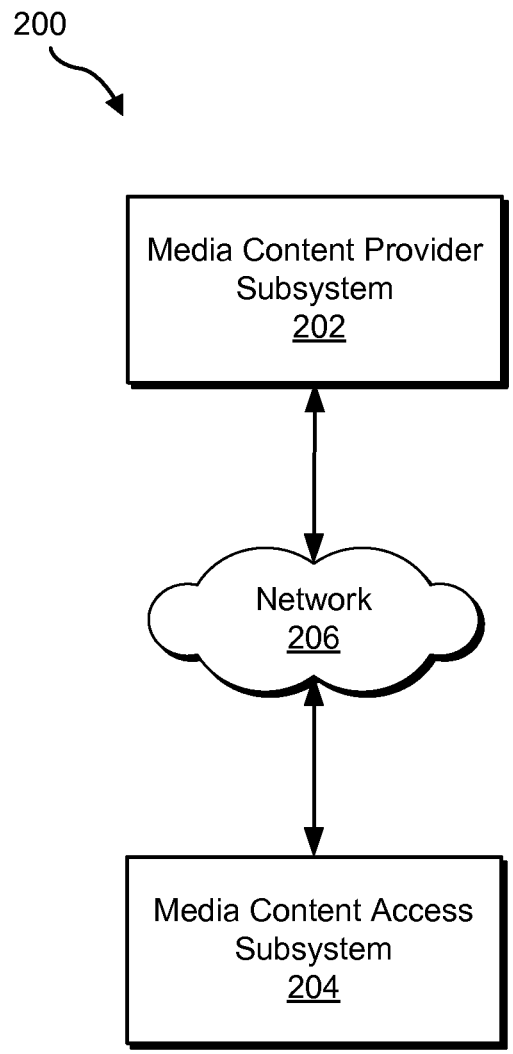
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, monitoring facility 102, interaction profile facility 104, presentation facility 106, and storage facility 108 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 is entirely implemented on access subsystem 204.

In some examples, provider subsystem 202 may be configured to generate or otherwise provide media content (e.g., in the form of one or more media content streams) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Figure 3:
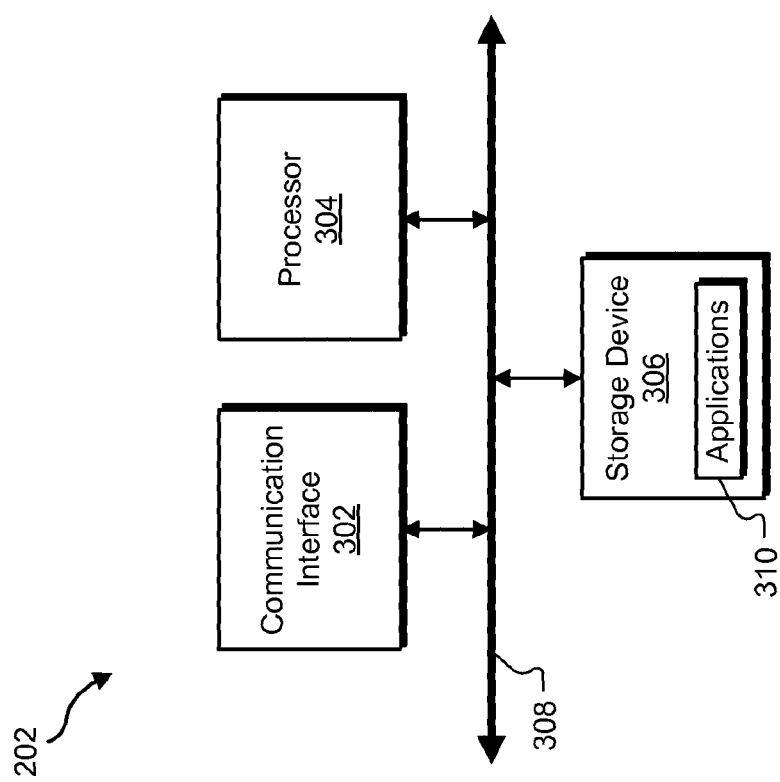
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit (e.g., broadcast, multicast, and/or narrowcast) data representative of one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, monitoring facility 102, interaction profile facility 104, presentation facility 106, and/or storage facility 108 may be implemented by or within one or more components of provider subsystem 202. For example, one or more applications 310 residing within storage device 306 may be configured to direct processor 304 to perform one or more processes or functions associated with monitoring facility 102, interaction profile facility 104, and/or presentation facility 106. Likewise, storage facility 108 may be implemented by or within storage device 306. For example, interaction profile data 110, media content data 112, and/or user profile data 114 may be stored within storage device 306.

Figure 4:
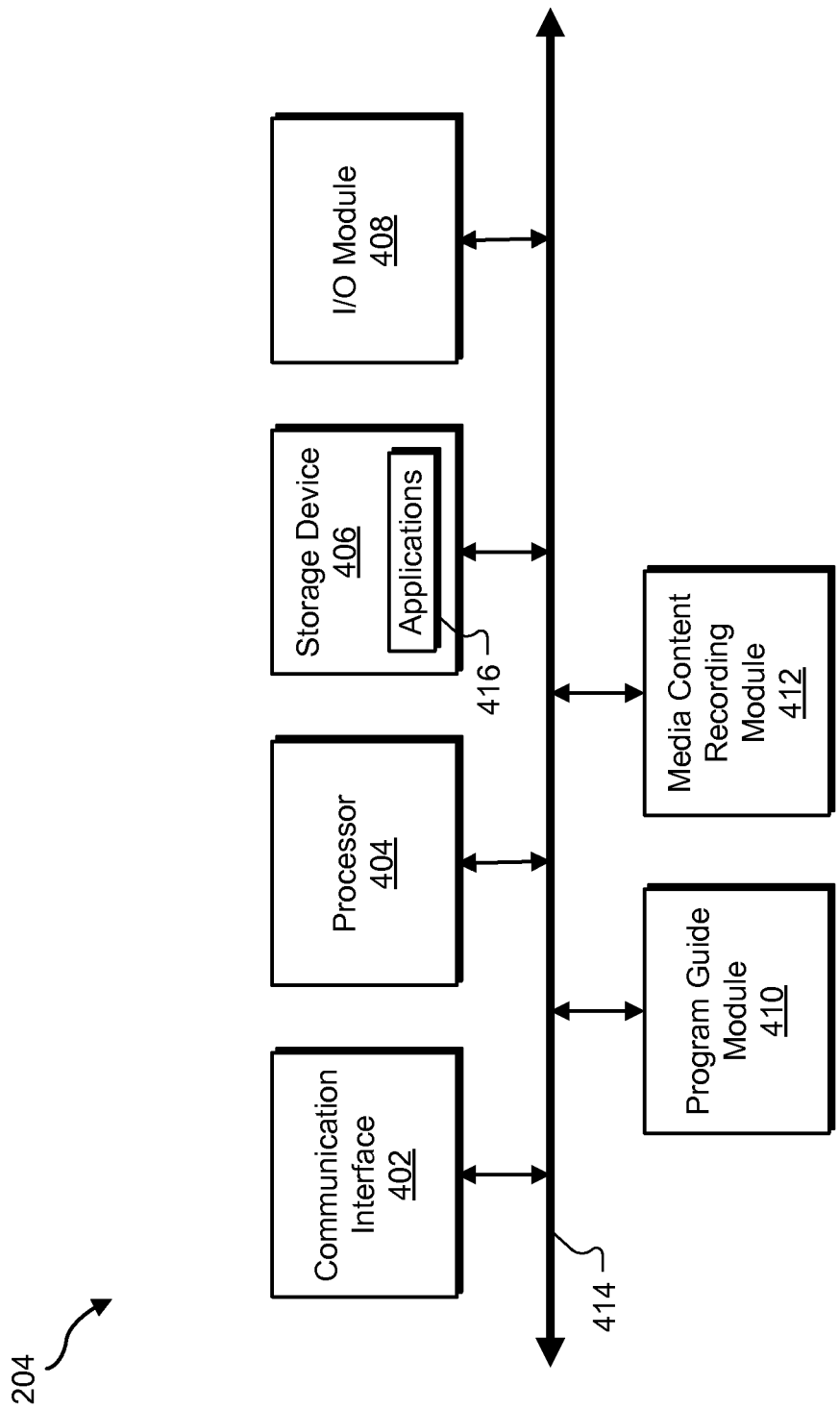
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box, a communications device, a mobile device (e.g., a mobile phone device), a handheld device, a personal computer, a phone device (e.g., Verizon Hub device), a personal-digital assistant device, gaming device, digital video recording ("DVR") device (e.g., a personal video recording ("PVR") device), a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 202 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit (e.g., broadcast, multicast, and/or narrowcast) data representative of one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 204. The term "media content carrier channel" or "media content channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled transmission times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 504 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

The program guide data may include information descriptive of a media content transmission schedule, including information descriptive of media content carrier channels, scheduled transmission times (e.g., programming time slots), media content instances, metadata for the media content instances, and relationships between the media content channels, transmission times, and media content instances. In certain embodiments, the program guide data received and stored by access subsystem 204 is descriptive of a media content transmission schedule covering a certain period of time (e.g., a twenty-four hour period, a week, two weeks, or a month). Accordingly, access subsystem 204 may be configured to periodically receive at least one update to the program guide data (i.e., updated program guide data) that is descriptive of a transmission schedule for a new period of time. For example, access subsystem 204 may be configured to receive updated program guide data on a daily basis (e.g., at a certain off-peak time each night).

Program guide module 410 may be configured to arrange and provide graphical data representative of a program guide view to I/O module 408 for inclusion in a GUI. I/O module 408 may generate and provide a GUI including the program guide view to a display for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

Media content recording module 412 may be configured to schedule recordings of data representative of media content instances. Typically, media content recording module 412 is configured to schedule recordings based on a media content transmission schedule, which may be represented by program guide data. As an example, media content recording module 412 may schedule a recording of a media content instance. When a scheduled transmission time for the media content instance arrives, media content recording module 412 may initiate a recording of the media content instance on an appropriate media content carrier channel associated with the scheduled transmission of the media content instance.

In some examples, monitoring facility 102, interaction profile facility 104, presentation facility 106, and/or storage facility 108 may be implemented by or within one or more components of access subsystem 204. For example, one or more applications 416 residing within storage device 406 may be configured to direct processor 404 to perform one or more processes or functions associated with monitoring facility 102, interaction profile facility 104, and/or presentation facility 106. Likewise, storage facility 108 may be implemented by or within storage device 406. For example, interaction profile data 110, media content data 112, and/or user profile data 114 may be stored within storage device 406.

Figure 5:
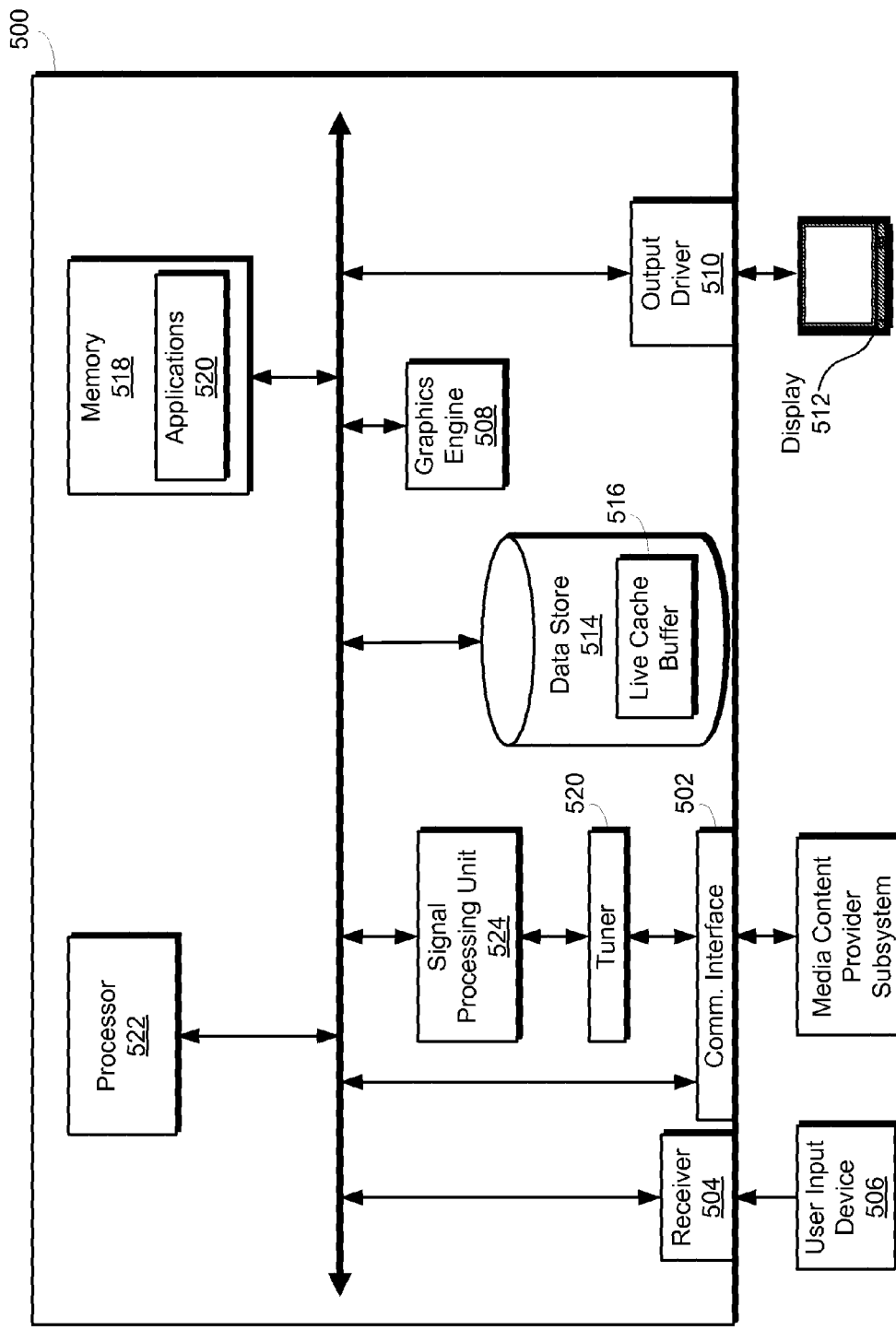
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 having access subsystem 204 implemented thereon. Device 500 may include one or more of the components of access subsystem 204 shown in FIG. 4 and may be configured to perform one or more of the processes and/or operations described herein. Device 500 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

As shown in FIG. 5, device 500 may include a communication interface 502 configured to receive media content (e.g., media content) and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

Figure 6:
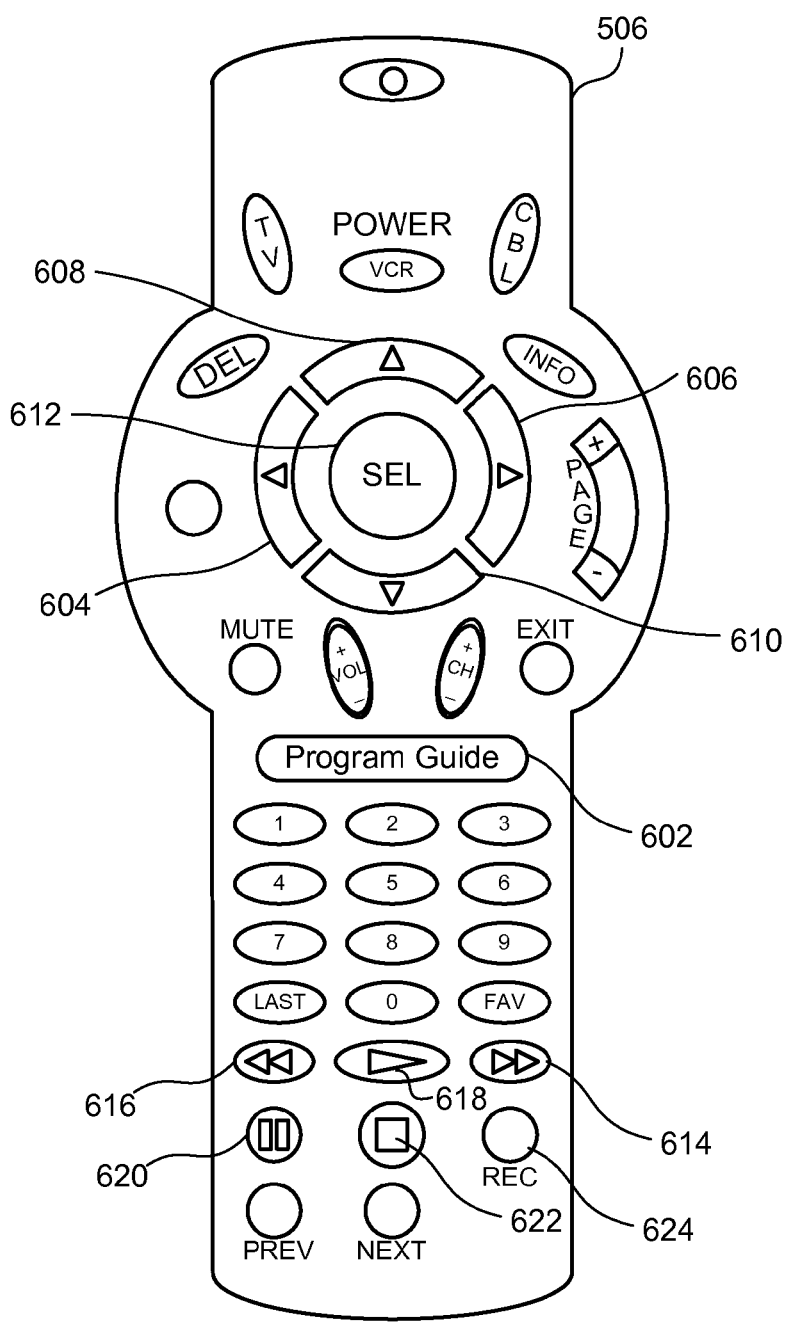
FIG. 6 illustrates an exemplary remote control user input device according to principles described herein.

FIG. 6 illustrates an exemplary remote control user input device 506. In some examples, input device 506 may be configured to facilitate a user controlling operations of access subsystem 204. For instance, a program guide button 602 may be configured to evoke a presentation of a program guide GUI on a display. A left button 604, a right button 606, an up button 608, a down button 610, and a select button 612 may be included and configured to facilitate a user evoking and/or navigating through various views, options, and GUIs displayed by a display. A fast forward or skip button 614, a reverse or rewind button 616, a play button 618, a pause button 620, a stop button 622, and/or a record button 624 may also be included and configured to facilitate a user navigating through, recording, and/or otherwise interacting with one or more media content instances. Input device 506 shown in FIG. 6 is merely illustrative of one of the many different types of user input devices that may be used to provide input commands to access subsystem 204.

Returning to FIG. 5, device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within device 500 in FIG. 5 for illustrative purposes only. It will be understood that data store 514 may additionally or alternatively be located external to device 500.

Data store 514 may include one or more live cache buffers 516. Live cache buffer 516 may additionally or alternatively reside in memory 518 or in a storage device external to device 500. In some examples, media content data may be temporarily stored in live cache buffer 516 to facilitate viewing and/or recording of the media content.

Device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by device 500 may reside in memory 518.

Device 500 may include one or more tuners 520. Tuner 520 may be configured to selectively receive media content carried on a particular media content carrier channel such that the media content may be processed by device 500. In some examples, media content received by tuner 520 may be temporarily buffered, or stored, in the live cache buffer 516. If there are multiple tuners 520, there may be a live cache buffer 516 corresponding to each of the tuners 520.

While tuner 520 may be used to receive certain media content-carrying signals transmitted by provider subsystem 202, device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of device 500 (e.g., processor 522 or signal processing unit 524, described in more detail below) without the signals going through tuner 520. For an IP-based signal, for example, signal processing unit 524 may function as an IP receiver.

Device 500 may include at least one processor, such as processor 522, configured to control and/or perform one or more operations of device 500. Device 500 may also include a signal processing unit 524 configured to process incoming media content. Signal processing unit 524 may be configured, for example, to demodulate and parse encoded digital media content. In some examples, device 500 may include one or more signal processing units 524 corresponding to each of the tuners 520.

As mentioned, the relative interest level of a user in media content accessed via access subsystem 204 may vary depending on a plurality of different factors. For example, a user may have a relatively mild interest in some media content instances, a relatively moderate interest in other media content instances, and a relatively extreme interest in other media content instances.

Such interest may be determined by the type of media content accessed by the user, a mood of the user during the time in which the user accesses the media content, a particular time or day during which the user accesses the media content, one or more other activities in which the user is participating while accessing the media content, and/or any other factor as may serve a particular application. For example, a user may have more interest in a news program during the evening than during the middle of the day.

In some examples, the relative interest level of a user in media content accessed via access subsystem 204 may be gauged by the manner in which the user interacts with access subsystem 204. Hence, as will be described in more detail below, a media content access experience may be customized for the particular user by monitoring interaction of the user with access subsystem 204.

Figure 7:
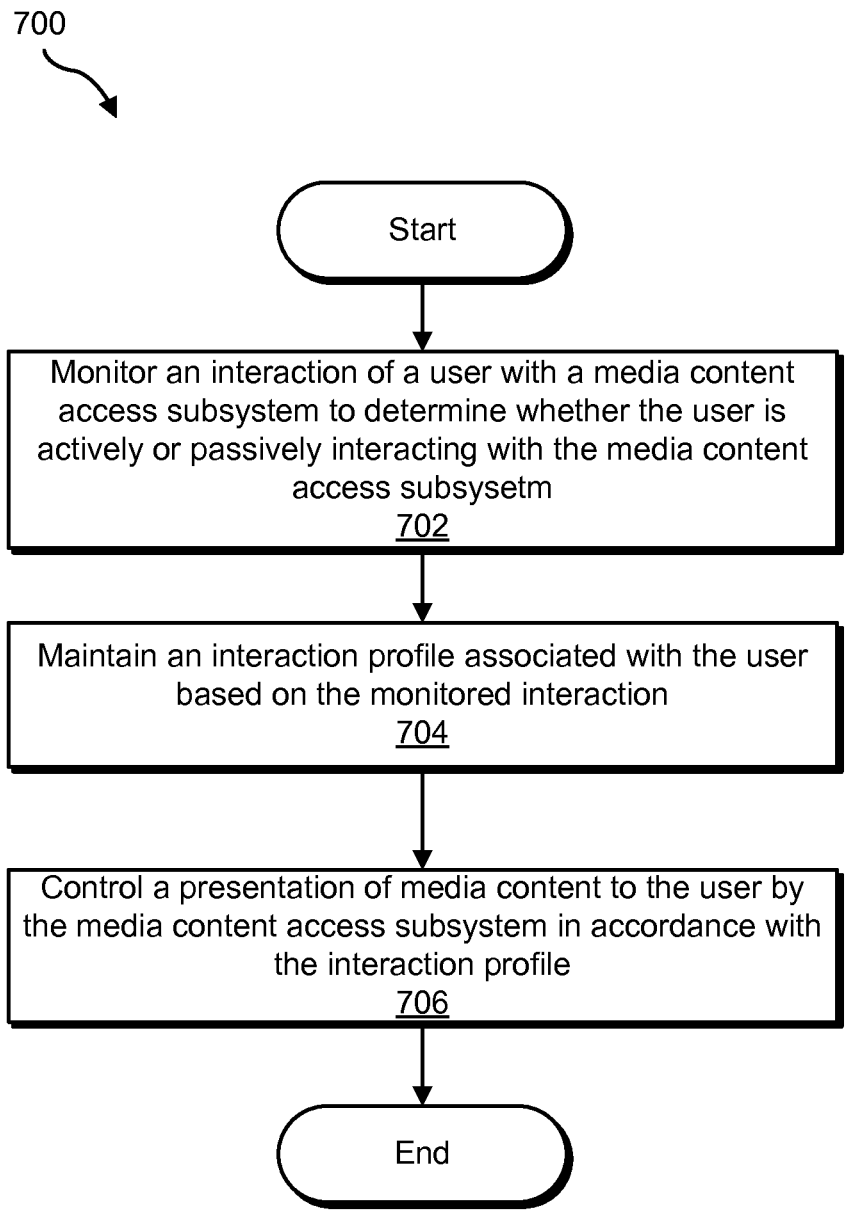
FIG. 7 illustrates an exemplary method of controlling a presentation of media content to a user based on interaction of the user with a media content access subsystem according to principles described herein.

FIG. 7 illustrates an exemplary method 700 of controlling a presentation of media content to a user based on interaction of the user with access subsystem 204. While FIG. 7 illustrates exemplary steps according to one embodiment, other embodiments may omit, add to, reorder, and/or modify any of the steps shown in FIG. 7.

In step 702, an interaction of a user with a media content access subsystem is monitored to determine whether the user is actively or passively interacting with the media content access subsystem. For example, monitoring facility 102 may be configured to detect one or more interaction events performed by or otherwise associated with the user. To this end, monitoring facility 102 may be configured to recognize when a particular user begins and ends interacting with access subsystem 204. For example, when access subsystem 204 is accessed by multiple users, each user may be required to log in to access subsystem 204 with a unique user identification code. Alternatively, monitoring facility 102 may be configured to automatically detect which user is interacting with access subsystem 204 based on the detected interaction events or on any other factor as may serve a particular application.

In some examples, an interaction event may include a command transmitted from an input device, e.g., user input device 506, to access subsystem 204. For example, a user may utilize user input device 506 to perform one or more interaction events such as, but not limited to, fast forwarding through media content (e.g., skipping one or more advertisements included within the media content), rewinding or going back within media content, adjusting (e.g., increasing, decreasing, or muting) a volume level associated with media content, scheduling a recording of media content, purchasing media content that is "on demand," flagging media content as a "favorite" or as something that the user dislikes, rating media content, changing a media content channel, selecting one or more options available within a program guide or other GUI displayed by access subsystem 204, powering access subsystem 204 on or off, and/or any other interaction event associated with access subsystem 204 as may serve a particular application.

Monitoring facility 102 may be further configured to record a timestamp associated with one or more detected interaction events. For example, monitoring facility 102 may be configured to record the time and day that a particular interaction event occurs. The recorded timestamps may be stored as data within storage facility 108 (e.g., as part of interaction profile data 110).

In some examples, monitoring facility 102 may be configured to monitor interaction of a user with access subsystem 204 by detecting one or more time periods of active and/or passive interaction of the user with access subsystem 204. During periods of active interaction, the user is actively engaged, using, paying attention to, or otherwise interacting with access subsystem 204. During periods of passive interaction, the user is only passively engaged, using, paying attention to, or otherwise interacting with access subsystem 204. For example, a user may be passively interacting with access subsystem 204 if media content (e.g., a television program) is playing in the background while the user is participating in one or more other activities (e.g., eating dinner, working, etc.). It will be recognized that there may be various levels of active and/or passive interaction. For example, a user extremely engrossed in a particular media content instance may be more actively interacting with access subsystem 204 than a user who is experiencing (e.g., viewing) a media content instance only because there is nothing else to do.

In some examples, the presence of one or more interaction events, or lack thereof, may be indicative of one or more time periods of active and/or passive interaction of the user with access subsystem 204. Hence, monitoring facility 102 may be configured to detect one or more time periods of active interaction of the user with access subsystem 204 by detecting a presence of one or more interaction events, or lack thereof, associated with active interaction. Likewise, monitoring facility 102 may be configured to detect one or more time periods of passive interaction of the user with access subsystem 204 by detecting a presence of one or more interaction events, or lack thereof, associated with passive interaction.

To illustrate, monitoring facility 102 may be configured to detect one or more time periods of active interaction of a user with access subsystem 204 by detecting when the user fast forwards through media content (e.g., skips one or more advertisements included within the media content), rewinds within media content to view the rewound portion again, adjusts (e.g., increase or decrease) a volume level associated with media content, schedules a recording of media content, purchases media content that is "on demand," flags media content as a "favorite" or as something that the user dislikes, rates media content, changes a media content channel, selects one or more options available within a program guide or other GUI displayed by access subsystem 204, powers access subsystem 204 on, and/or performs any other interaction event associated with access subsystem 204 as may serve a particular application.

Monitoring facility 102 may be configured to detect one or more time periods of passive interaction of a user with access subsystem 204 by detecting a lack or absence of input commands being transmitted to access subsystem 204 during a specified time period. Such input commands may include, but are not limited to, fast forwarding, rewinding, scheduling, purchasing, flagging, rating, selecting of options within a program guide or other GUI, or any other command transmitted from user input device 506 to access subsystem 204. Additionally or alternatively, monitoring facility 102 may be configured to detect one or more time periods of passive interaction of a user with access subsystem 204 by detecting one or more interaction events (e.g., a transmission of an input command to decrease or mute a volume, change a channel, etc.).

In some examples, monitoring facility 102 is configured to continuously or periodically monitor interaction of a user with access subsystem 204. In this manner, as will be described in more detail below, an interaction profile may be dynamically updated over time, thereby resulting in a more customized media content access experience for the user.

In step 704, an interaction profile associated with the user based on the monitored interaction is maintained. For example, interaction profile facility 104 may be configured to maintain the interaction profile by generating the interaction profile based on the interaction between the user and access subsystem 204 as detected by monitoring facility 102, updating the interaction profile, and/or storing the interaction profile within storage facility 108.

In some examples, the interaction profile may be dynamically updated as interaction events are detected over time. In this manner, the interaction profile may be used to consistently improve the customized media content access experience for the user.

The interaction profile may be maintained in accordance with any suitable heuristic or algorithm. In some examples, data representative of detected interaction events, timestamps associated with the detected interaction events, and/or any other data associated with the interaction events (e.g., metadata corresponding to media content being presented during an occurrence of the interaction events) may be processed by interaction profile facility 104 to generate and/or update the interaction profile. It will be recognized that an interaction profile may correspond to a single user of access subsystem 204 or to multiple users of access subsystem 204 as may serve a particular application.

In some examples, an interaction profile associated with a user of access subsystem 204 may be configured to indicate periods of time during which the user is typically actively interacting with access subsystem 204 and/or periods of time during which the user is typically passively interacting with access subsystem 204. In this manner, as will be described in more detail below, media content configured to target actively interacting users may be presented to a user during periods of time during which the user is actively interacting with access subsystem 204 and media content configured to target passively interacting users may be presented to the user during periods of time during which the user is passively interacting with access subsystem 204.

The interaction profile associated with a user of access subsystem 204 may additionally or alternatively be configured to indicate one or more presentation schedules of media content that are preferred by the user. For example, monitoring facility 102 may be configured to detect patterns of interaction events that are repeatedly performed by a user. These interaction events may be used to update the interaction profile corresponding to the user such that the interaction profile may be used to predict preferred presentation schedules of media content. In this manner, as will be described in more detail below, access subsystem 204 may automatically present media content to the user in accordance with the preferred presentation schedules.

In some examples, an interaction profile associated with a user of access subsystem 204 may be associated with one or more moods or emotional states of a user. For example, a user may transmit a command to access subsystem 204 representative of a particular mood that the user is in. Interaction events detected thereafter for a predetermined amount of time or until the user selects a different mood may be associated with the indicated mood. In this manner, the interaction profile may represent how the user interacts with processing subsystem 204 while in one or more moods.

To illustrate, a user may transmit a command to access subsystem 204 (e.g., by selecting an option within a GUI or pressing one or more buttons on user input device 506) indicating to access subsystem 204 that the user is in a "happy" mood. Interaction events detected by monitoring facility 102 thereafter may be associated with a "happy" mood within the interaction profile associated with the user.

In step 706, a presentation of media content to the user by access subsystem 204 is controlled in accordance with the interaction profile. For example, presentation facility 106 may be configured to control a presentation of media content to the user in any of a variety of manners, as will be described in more detail below.

In some examples, presentation facility 106 may be configured to control a presentation of media content to a user of access subsystem 204 by selecting media content and/or an order in which media content is presented to the user in accordance with the interaction profile. For example, presentation facility 106 may be configured to determine a playlist comprising a plurality of media content instances selected in accordance with the interaction profile. In some examples, the selection of the media content instances may additionally or alternatively be based on one or more preferences indicated by the user and/or a user profile associated with the user.

To illustrate, a user of access subsystem 204 may select an option available via access subsystem 204 that presents (e.g., streams) customized media content to the user. In some examples, the media content includes a plurality of media content instances. Presentation facility 106 may be configured to arrange an order in which the media content instances are presented to the user in accordance with the interaction profile. For example, an interaction profile associated with a particular user may indicate that the user typically prefers to watch the news followed by one or more sporting events during a particular time period of the day. Presentation facility 106 may accordingly select and automatically present a news program followed by a sports program to the user. In this manner, the user does not have to manually select an order in which media content is presented every time he or she accesses media content available via access subsystem 204.

A user may access a customized media content playlist or stream in any suitable manner as may serve a particular application. For example, a user may tune to a particular channel configured to present the customized media content playlist or stream, select an option with a GUI (e.g., a program guide) configured to initiate the customized media content playlist or stream, or simply turn on access subsystem 204 to access the customized media content playlist or stream.

In some examples, a user may fast forward within and/or skip between media content instances included within a customized media content playlist. In some examples, these actions may be detected and used to update an interaction profile associated with the user. For example, a user may transmit a command to access subsystem 204 to "shuffle" between media content instances and/or between different playlists of media content. The shuffle command may be detected and used to update an interaction profile associated with the user.

In some examples, presentation facility 106 may be configured to control a presentation of media content to a user of access subsystem 204 by determining a presentation schedule of the media content in accordance with the interaction profile. As used herein, a "presentation schedule" refers to a schedule defining when one or more media content instances are to be presented to a user.

For example, an interaction profile corresponding to a particular user may indicate that the user prefers to passively experience a news program or other narrative-type program in the background while the user participates in another activity (e.g., eating, reading, talking, working, etc.) during a particular time period of the day. The interaction profile corresponding to the user may also indicate that during a different time period of the day, the user prefers to actively experience one or more media content instances marked by the user as being "favorites." Presentation facility 106 may accordingly select and adjust the presentation schedule of such media content instances to fit the preferred presentation schedule of the user.

In some examples, the presentation schedule does not correspond to a transmission schedule of one or more media content instances. Hence, presentation facility 106 may be configured to automatically record one or more media content instances transmitted at times that do not correspond with the presentation schedule so that the media content instances may be presented to the user according to the presentation schedule.

In some examples, presentation facility 106 may be configured to control a presentation of media content to a user of access subsystem 204 by presenting media content configured to target an actively interacting audience to the user during periods of time associated with an active interaction of the user with access subsystem 204 (e.g., time periods during which the user is actively interacting with access subsystem 204). Likewise, presentation facility 106 may be configured to present media content to target a passively interacting audience to the user during periods of time associated with a passive interaction of the user with access subsystem 204 (e.g., time periods during which the user is passively interacting with access subsystem 204).

To illustrate, one or more advertisements may be dynamically inserted into the media content presented to a user based upon whether the user is actively or passively interacting with access subsystem 204. An advertisement inserted into media content presented to an actively interacting user may be configured to target an actively interacting audience by including appealing visual effects, content associated with a particular media content instance being experienced by the user, and/or any other content configured to target an actively interacting audience. Conversely, an advertisement inserted into media content presented to a passively interacting user may be configured to target a passively interacting audience by focusing on an audible message or jingle more than on visual effects, for example. It will be recognized that advertisements may be configured to target actively and/or passively interacting audiences in any suitable manner as may serve a particular application.

Dynamic insertion of advertisements based on an interaction profile of a user may result in an optimized media content access experience for a user and in an optimized advertisement campaign for one or more advertisers. By facilitating the ability to target active versus passive users of access subsystems 204, advertisers may more effectively reach their intended audiences, content providers may more effectively charge for advertisement insertion within media content, and users may more effectively respond to such advertisements.

An example of how advertisers may more effectively reach their intended audience will now be presented. It will be recognized that the following example is merely illustrative of the many ways in which the methods and systems described herein may facilitate more effective advertising within a media content access experience of a user of access subsystem 204. In the example, monitoring facility 102 may detect that a user consistently fast forwards through or skips advertisements included within media content when the user is actively interacting with access subsystem 204. However, monitoring facility 102 may further detect that the user likes to passively listen to media content in the background while participating in other activities. The interaction profile may be updated accordingly by interaction profile facility 104. Based on the updated interaction profile, presentation facility 106 may determine that presentation of advertisements during periods of active interaction of the user are ineffective and that advertisements presented during periods of passive interaction of the user that focus on an audible message or jingle are effective in targeting the user. Presentation facility 106 may then present advertisements to the user accordingly.

In some examples, presentation facility 106 may be configured to control a presentation of media content to a user of access subsystem 204 by adjusting a manner in which the media content is presented based on the interaction profile. For example, a volume level may be adjusted depending on the level of interaction of the user with access subsystem 204, the mood of the user, and/or any other factor represented by the interaction profile. To illustrate, the volume may be automatically decreased during periods of passive interaction of the user with access subsystem 204, automatically increased during periods of active interaction of the user with access subsystem 204, and/or muted during periods when the user typically prefers to have the volume muted. Other examples of adjusting a manner in which media content is presented to a user based on an interaction profile of the user include, but are not limited to, adjusting a color, speed, replay frequency, and/or other attribute associated with the presentation of media content.

In some examples, presentation facility 106 may be configured to control a presentation of media content to a user of access subsystem 204 by recommending at least one media content instance to the user in accordance with the interaction profile. For example, it may be determined that the user is actively engaged with access subsystem 204 and that the user has a history of accessing music videos made in the 1980s. Presentation facility 106 may be configured to recommend other music videos from the 1980s in which the user may be interested. In some examples, recommended media content may be automatically presented to the user. Additionally or alternatively, recommended media content may be presented to the user in response to a request transmitted from the user to access subsystem 204.

In some examples, presentation facility 106 may be configured to control a presentation of media content to a user of access subsystem 204 by presenting the media content in accordance with a mood of the user as defined within an interaction profile associated with the user. For example, monitoring facility 102 may recognize certain interaction events performed by the user that are associated with a particular mood of the user as defined within interaction profile. In response, presentation facility 106 may select media content appropriate for the detected mood for presentation to the user. Selection of such media content may be performed in any suitable manner. For example, presentation facility 106 may process metadata associated with various media content instances to determine which media content instances would be appropriate for the detected mood.

Figure 8:
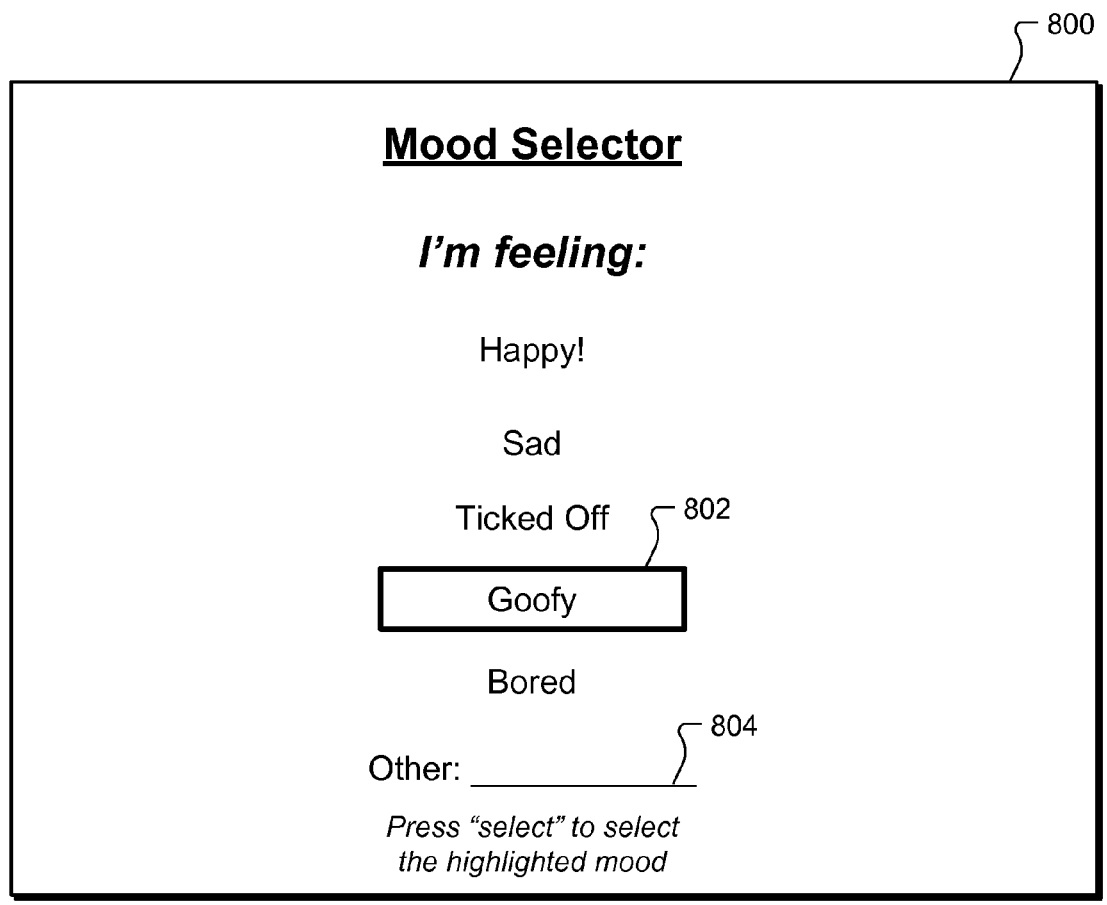
FIG. 8 illustrates an exemplary graphical user interface that may displayed by a media content access subsystem and used by a user to select a desired mood according to principles described herein.

Additionally or alternatively, presentation facility 106 may be configured to control a presentation of media content to a user of access subsystem 204 in response to a mood selected by the user. For example, FIG. 8 illustrates an exemplary GUI 800 that may displayed by access subsystem 204 and used by a user to select a desired mood. It will be recognized that GUI 800 is merely illustrative of the many different ways that a user may select a particular mood. For example, a user may additionally or alternatively select a mood by pressing a pre-programmed button on user input device 506.

As shown in FIG. 8, a user may highlight a desired mood by positioning a selection box 802 over the desired mood. A "select" button may be pressed to select the highlighted mood. As shown in FIG. 8, a user has highlighted a "goofy" mood. If this mood is selected, presentation facility 106 may direct access subsystem 204 to present media content that may be appropriate for a goofy mood.

FIG. 8 also shows that a user may input a mood not listed within GUI 800. For example, field 804 may be filled in with a mood that is not already listed within GUI 800. In response, interaction profile may be updated with the newly input mood and monitoring facility 102 may begin to associate detected interaction events with the newly entered mood for a predetermined time or until another mood is selected.

In some examples, presentation facility 106 may be further configured to control the presentation of media content to the user in accordance with a user profile associated with the user. As used herein, a user profile is configured to represent one or more personal traits associated with the user that are not already defined within an interaction profile associated with the user. For example, a user profile may include data representative of a user's age, gender, income level, profession, family status, nationality, preferred genre of media content, etc. Such information may be used to further customize the presentation of media content to the user. For example, media content generally associated with a particular age group or other demographic factor may be presented to the user in the form of a media content recommendation depending on the particular level of interest or interaction of the user as defined by the interaction profile associated with the user.

Data representative of a user profile associated with a user may be stored within storage facility as user profile data 114. User profile data 114 may updated in response to one or more commands initiated by a user, automatically acquired from a source external to system 100, or from any other source as may serve a particular application.

Figure 9:
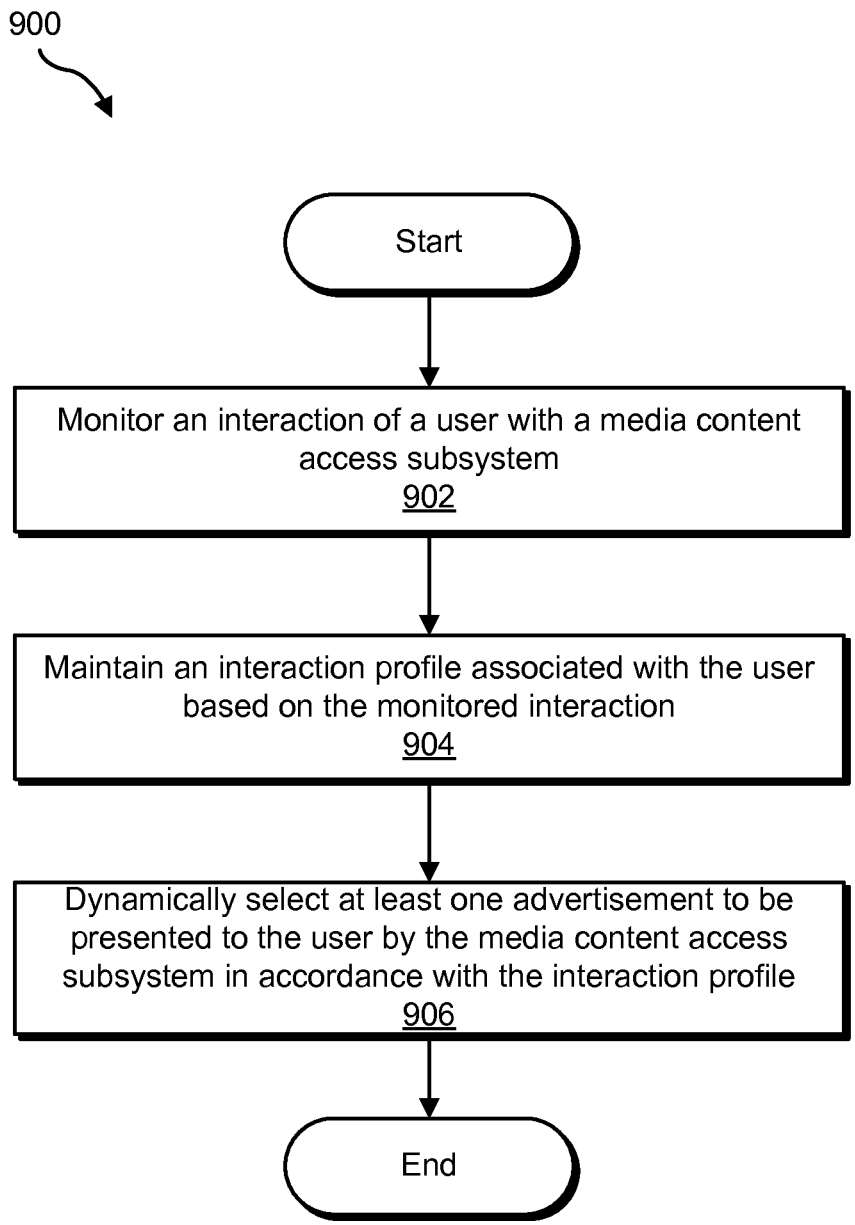
FIG. 9 illustrates another exemplary method of controlling a presentation of media content to a user based on interaction of the user with a media content access subsystem according to principles described herein.

FIG. 9 illustrates another exemplary method 900 of controlling a presentation of media content to a user based on interaction of the user with access subsystem 204. While FIG. 9 illustrates exemplary steps according to one embodiment, other embodiments may omit, add to, reorder, and/or modify any of the steps shown in FIG. 9.

In step 902, an interaction of a user with a media content access subsystem is monitored. The interaction of the user with the media content access subsystem may be performed in any of the ways described herein.

In step 904, an interaction profile associated with the user based on the monitored interaction is maintained. The interaction profile may be maintained in any of the ways described herein.

In step 906, at least one advertisement is dynamically selected to be presented to the user by the media content access subsystem in accordance with the interaction profile. The at least one advertisement may be dynamically selected in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   monitoring, by at least one computing device, an interaction of a user with a media content access subsystem to determine whether the user is actively or passively interacting with the media content access subsystem, the monitoring comprising
   detecting a first time period during which the user is actively interacting with the media content access subsystem by detecting one or more input commands transmitted to the media content access subsystem by a remote control user input device being utilized by the user to control the media content access subsystem, and
   detecting a second time period during which the user is passively interacting with the media content access subsystem by detecting an absence of input commands being transmitted to the media content access subsystem by the remote control user input device during a specified time period;
   maintaining, by the at least one computing device, an interaction profile associated with the user based on the monitored interaction;
   detecting, by the at least one computing device, a selection by the user of a mood included in a plurality of moods provided for display to the user in a graphical user interface;
   updating, by the at least one computing device in response to the detected selection by the user of the mood, the interaction profile associated with the user; and
   controlling, by the at least one computing device, a presentation of a plurality of television media content instances to the user during the first and second time periods by the media content access subsystem in accordance with the interaction profile by
   including, within the plurality of television media content instances that are presented to the user during the first time period and based on the mood selected by the user and the detecting of the one or more input commands transmitted to the media content access subsystem by the remote control user input device, one or more television media content instances configured to target an actively interacting audience,
   automatically increasing, based on the detecting of the one or more input commands transmitted to the media content access subsystem by the remote control user input device and based on the mood selected by the user, a volume level of the media content access subsystem during the first time period,
   including, within the plurality of television media content instances that are presented to the user during the second time period and based on the mood selected by the user and the detecting of the absence of input commands being transmitted to the media content access subsystem by the remote control user input device during the specified time period, one or more television media content instances configured to target a passively interacting audience, and
   automatically decreasing, based on the detecting of the absence of input commands being transmitted to the media content access subsystem by the remote control user input device during the specified time period and based on the mood selected by the user, the volume level of the media content access subsystem during the second time period.

2. The method of claim 1, wherein the monitoring further comprises detecting at least one additional interaction event performed by the user and wherein the maintaining comprises updating the interaction profile in accordance with the at least one additional interaction event.

3. The method of claim 1, wherein the monitoring further comprises recording at least one timestamp associated with the one or more input commands, and wherein the maintaining comprises updating the interaction profile in accordance with the at least one timestamp.

4. The method of claim 1, wherein the maintaining of the interaction profile comprises dynamically updating the interaction profile based on the monitored interaction.

5. The method of claim 1, wherein the controlling further comprises presenting the television media content instances to the user in an order determined in accordance with the interaction profile.

6. The method of claim 1, wherein the controlling further comprises determining a presentation schedule of the television media content instances in accordance with the interaction profile.

7. The method of claim 1, wherein the controlling further comprises recommending at least one of the television media content instances to the user in accordance with the interaction profile.

8. The method of claim 1, wherein the controlling further comprises adjusting a manner in which the television media content instances are presented to the user by the media content access subsystem in accordance with the interaction profile.

9. The method of claim 1, wherein the controlling further comprises controlling the presentation of the television media content instances to the user by the media content access subsystem in accordance with a user profile associated with the user.

10. The method of claim 1, wherein the television media content instances comprise at least one of an advertisement, a television program, an on-demand media program, a pay-per-view media program, and an Internet Protocol television ("IPTV") media content program.

11. A method comprising:
   monitoring, by at least one computing device, an interaction of a user with a media content access subsystem to determine whether the user is actively or passively interacting with the media content access subsystem, the monitoring comprising
      detecting a first time period during which the user is actively interacting with the media content access subsystem by detecting one or more input commands transmitted to the media content access subsystem by a remote control user input device being utilized by the user to control the media content access subsystem, and
      detecting a second time period during which the user is passively interacting with the media content access subsystem by detecting an absence of input commands being transmitted to the media content access subsystem by the remote control user input device during a specified time period;
   maintaining, by the at least one computing device, an interaction profile associated with the user based on the monitored interaction;
   detecting, by the at least one computing device, a selection by the user of a mood included in a plurality of moods provided for display to the user in a graphical user interface;
   updating, by the at least one computing device in response to the detected selection by the user of the mood, the interaction profile associated with the user;
   dynamically selecting, by the at least one computing device based on the mood selected by the user and the detecting of the one or more input commands transmitted to the media content access subsystem by the remote control user input device, at least one television advertisement configured to target an actively interacting audience for presentation to the user by the media content access subsystem in association with a presentation of a television program by the media content access subsystem during the first time period;
   automatically increasing, by the at least one computing device based on the mood selected by the user and the detecting of the one or more input commands transmitted to the media content access subsystem by the remote control user input device, a volume level of the media content access subsystem during the first time period;
   dynamically selecting, by the at least one computing device based on the mood selected by the user and the detecting of the absence of input commands being transmitted to the media content access subsystem by the remote control user input device during the specified time period, at least one television advertisement configured to target a passively interacting audience for presentation to the user by the media content access subsystem in association with a presentation of the television program by the media content access subsystem during the second time period; and
   automatically decreasing, by the at least one computing device based on the mood selected by the user and the detecting of the absence of input commands being transmitted to the media content access subsystem by the remote control user input device during the specified time period, the volume level of the media content access subsystem during the second time period.

12. A system comprising:
   at least one computing device that comprises:
   a monitoring facility that monitors an interaction of a user with a media content access device to determine whether the user is actively or passively interacting with the media content access device, wherein the monitoring facility monitors the interaction of the user with the media content access device by
      detecting a first time period during which the user is actively interacting with the media content access device by detecting one or more input commands transmitted to the media content access device by a remote control user input device being utilized by the user to control the media content access device, and
      detecting a second time period during which the user is passively interacting with the media content access device by detecting an absence of input commands being transmitted to the media content access device by the remote control user input device during a specified time period;
   an interaction profile facility that maintains an interaction profile associated with the user based on the monitored interaction; and
   a presentation facility that controls presentation of a plurality of television media content instances to the user during the first and second time periods by the media content access device in accordance with the interaction profile by
      including, within the plurality of television media content instances that are presented to the user during the first time period and based on the detecting of the one or more input commands transmitted to the media content access device by the remote control user input device, one or more television media content instances configured to target an actively interacting audience,
      automatically increasing, based on the detecting of the one or more input commands transmitted to the media content access device by the remote control user input device, a volume level of the media content access device during the first time period,
      including, within the at plurality of television media content instances that are presented to the user during the second time period and based on the detecting of the absence of input commands being transmitted to the media content access device by the remote control user input device during the specified time period, one or more television media content instances configured to target a passively interacting audience, and
      automatically decreasing, based on the detecting of the absence of input commands being transmitted to the media content access device by the remote control user input device during the specified time period, the volume level of the media content access device during the second time period,
   wherein the presentation facility further provides a graphical user interface for display to the user, the graphical user interface including a plurality of user selectable moods, wherein the monitoring facility further detects a selection by the user of a mood included in the plurality of moods provided for display to the user in the graphical user interface, wherein the interaction profile facility further updates the interaction profile based on the mood selected by the user, and wherein the including of the one or more television media content instances configured to target the actively interacting audience, the automatically increasing of the volume level of the media content access device during the first time period, the including of the one or more television media content instances configured to target the passively interacting audience, and the automatically decreasing of the volume level of the media content access device during the second time period are each further based on the mood selected by the user.

13. The system of claim 12, wherein the monitoring facility further monitors the interaction of the user with the media content access device by detecting at least one additional interaction event performed by the user, and wherein the interaction profile facility updates the interaction profile in accordance with the at least one additional interaction event.

* * * * *